(12) United States Patent
Hirakawa et al.

(10) Patent No.: US 10,590,508 B2
(45) Date of Patent: Mar. 17, 2020

(54) METHOD FOR MANUFACTURING SHAFT BODY

(71) Applicant: MITSUBISHI HITACHI POWER SYSTEMS, LTD., Kanagawa (JP)

(72) Inventors: Yuichi Hirakawa, Tokyo (JP); Hiroaki Fukushima, Tokyo (JP); Shin Nishimoto, Yokohama (JP); Hiroyuki Endo, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 297 days.

(21) Appl. No.: 15/516,760

(22) PCT Filed: Oct. 9, 2015

(86) PCT No.: PCT/JP2015/078789
§ 371 (c)(1),
(2) Date: Apr. 4, 2017

(87) PCT Pub. No.: WO2016/056654
PCT Pub. Date: Apr. 14, 2016

(65) Prior Publication Data
US 2017/0298468 A1    Oct. 19, 2017

(30) Foreign Application Priority Data
Oct. 10, 2014   (JP) .................................. 2014-208814

(51) Int. Cl.
*C21D 9/50* (2006.01)
*B23K 9/235* (2006.01)
(Continued)

(52) U.S. Cl.
CPC ............. *C21D 9/50* (2013.01); *B23K 9/0026* (2013.01); *B23K 9/235* (2013.01); *B23K 31/00* (2013.01);
(Continued)

(58) Field of Classification Search
CPC ...................................................... C21D 9/50
See application file for complete search history.

(56) References Cited

U.S. PATENT DOCUMENTS 4,414,024 A * 11/1983 Siga ........................ C22C 38/22
148/325
5,189,279 A    2/1993 Foster, III et al.
(Continued)

FOREIGN PATENT DOCUMENTS

EP          2 439 297         4/2012
FR          2439309 A1 *      5/1980   ............. C21D 6/004
(Continued)

OTHER PUBLICATIONS

Espacenet Translation of FR-2439309. pp. 1-8. (Year: 1980).*
(Continued)

*Primary Examiner* — Scott R Kastler
(74) *Attorney, Agent, or Firm* — Wenderoth, Lind & Ponack, L.L.P.

(57) ABSTRACT

A method for manufacturing a shaft body by welding a plurality of shaft members together and forming the shaft body, the method including: a primary tempering step of subjecting a range in at least one of the shaft members, which is in the vicinity of an end of another shaft member side adjacent thereto, to tempering before the shaft members are welded together so that a strength of an end side of a region thereof is lower than a strength at a side which is opposite to the end of the region thereof; a welding step of welding the shaft members together after the primary tempering step; and a secondary tempering step of tempering the vicinity of a weld part between the shaft members after the welding step.

9 Claims, 6 Drawing Sheets

(51) Int. Cl.
  *C21D 9/28* (2006.01)
  *B23K 31/00* (2006.01)
  *B23K 31/02* (2006.01)
  *F01D 5/06* (2006.01)
  *B23K 9/00* (2006.01)
  *C21D 6/00* (2006.01)
  *F01D 5/30* (2006.01)
  *B23K 103/04* (2006.01)
  *B23K 103/18* (2006.01)
  *B23K 101/00* (2006.01)

(52) U.S. Cl.
  CPC .............. *B23K 31/02* (2013.01); *C21D 6/002* (2013.01); *C21D 9/28* (2013.01); *F01D 5/06* (2013.01); *F01D 5/063* (2013.01); *F01D 5/30* (2013.01); *B23K 2101/001* (2018.08); *B23K 2103/04* (2018.08); *B23K 2103/05* (2018.08); *B23K 2103/18* (2018.08); *F05D 2220/31* (2013.01); *F05D 2230/232* (2013.01); *F05D 2230/40* (2013.01); *F05D 2240/24* (2013.01); *F05D 2240/60* (2013.01); *F05D 2300/171* (2013.01)

(56) References Cited

U.S. PATENT DOCUMENTS

| | | |
|---|---|---|
| 5,817,192 A | 10/1998 | Kawai et al. |
| 6,344,098 B1 | 2/2002 | Maiming et al. |
| 6,499,946 B1 | 12/2002 | Yamada et al. |
| 2005/0236079 A1 | 10/2005 | Ueta et al. |
| 2007/0284018 A1 | 12/2007 | Hamano et al. |
| 2008/0085192 A1 | 4/2008 | Fukuda et al. |
| 2009/0263249 A1 | 10/2009 | Kern |
| 2010/0296938 A1 | 11/2010 | Nishimoto et al. |
| 2011/0126945 A1 | 6/2011 | Nishimoto et al. |
| 2011/0206525 A1 | 8/2011 | Shige et al. |
| 2011/0229339 A1 | 9/2011 | Yamada et al. |
| 2012/0189459 A1 | 7/2012 | Farineau et al. |
| 2012/0189460 A1 | 7/2012 | Farineau et al. |
| 2012/0189461 A1 | 7/2012 | Farineau et al. |
| 2013/0101425 A1* | 4/2013 | Arai ............... F01D 5/28 416/224 |
| 2013/0177431 A1 | 7/2013 | Farineau et al. |

FOREIGN PATENT DOCUMENTS

| | | |
|---|---|---|
| JP | 58-217636 | 12/1983 |
| JP | 7-171681 | 7/1995 |
| JP | 2948324 | 9/1999 |
| JP | 2001-317301 | 11/2001 |
| JP | 2002-235116 | 8/2002 |
| JP | 2003-49223 | 2/2003 |
| JP | 2003-145271 | 5/2003 |
| JP | 2005-344527 | 12/2005 |
| JP | 2007-321630 | 12/2007 |
| JP | 2008-93668 | 4/2008 |
| JP | 4288304 | 7/2009 |
| JP | 2009-538397 | 11/2009 |
| JP | 4430974 | 3/2010 |
| JP | 2010-131629 | 6/2010 |
| JP | 4800856 | 10/2011 |
| JP | 2012-6787 | 1/2012 |
| JP | 2012-36485 | 2/2012 |
| JP | 2012-77667 | 4/2012 |
| JP | 2012-82517 | 4/2012 |
| JP | 4908137 | 4/2012 |
| JP | 4929399 | 5/2012 |
| JP | 4951488 | 6/2012 |
| JP | 4959744 | 6/2012 |
| JP | 2012-154322 | 8/2012 |
| JP | 2012-154323 | 8/2012 |
| JP | 2012-154324 | 8/2012 |
| JP | 5011931 | 8/2012 |
| JP | 2012-250268 | 12/2012 |
| JP | 2013-142388 | 7/2013 |
| JP | 2013-144837 | 7/2013 |
| JP | 2013-245383 | 12/2013 |
| WO | 2009/154245 | 12/2009 |
| WO | 2010/041506 | 4/2010 |
| WO | 2010/053023 | 5/2010 |

OTHER PUBLICATIONS

International Search Report dated Dec. 22, 2015 in corresponding International (PCT) Application No. PCT/JP2015/078789, with English translation.

Written Opinion of the International Searching Authority dated Dec. 22, 2015 in corresponding International (PCT) Application No. PCT/JP2015/078789, with English translation.

* cited by examiner

METHOD FOR MANUFACTURING SHAFT BODY

TECHNICAL FIELD

The present invention relates to a method for manufacturing a shaft body by welding a plurality of shaft members together and forming the shaft body.

Priority is claimed on Japanese Patent Application No. 2014-208814, filed Oct. 10, 2014, the content of which is incorporated herein by reference.

BACKGROUND ART

A method for manufacturing a turbine rotor (a shaft body) constituting a steam turbine by preparing a plurality of divided shaft members and welding and joining the divided shaft members together is known (for example, refer to Patent Literature 1). According to such a method, different materials can be applied to each of the shaft members, and materials of the shaft members can be selected in accordance with a temperature distribution in the steam turbine.

When a turbine rotor includes three members divided from each other in an axial direction thereof, material selection, in which a high Cr steel with excellent high temperature strength is used as a base material of a central portion disposed at a position at which an ambient temperature in a steam turbine is in a high temperature region and low alloy steels are used at other sites, can be performed.

In such a manufacturing method, post weld heat treatment (PWHT) is generally performed for the purpose of securing toughness of a welding metal formed between adjacent shaft member and decreasing hardness of a welded heat affected zone (a heat-affected zone; HAZ).

CITATION LIST

Patent Literature

[Patent Literature 1]
  Japanese Patent No. 4288304

SUMMARY OF INVENTION

Technical Problem

It is known that, in the case of a low alloy steel side, a post weld heat treatment temperature is higher than a tempering temperature of a material thereof when post weld heat treatment is performed. Therefore, the strength of a base material also decreases at the same time.

On the other hand, since the initial strength of the base material is determined according to requirements with respect to the strength in the vicinity of a last stage, to which high stress is applied, in the case of a shaft member including a blade groove at which a last-stage turbine blade is installed among a plurality of shaft members, the base material strength before welding is adjusted to be higher in consideration of an amount of strength decrease after the post weld heat treatment.

Here, when a temperature change in a circumferential direction during the post weld heat treatment is large, that is, when uniformity of a heating temperature in the post weld heat treatment is not good, non-uniformity of the strength after the treatment in the circumferential direction occurs. Particularly, when the base material strength is adjusted to be higher, uniformity deteriorates along with increased strength change.

In order to suppress deterioration of uniformity of strength, the post weld heat treatment is generally performed using an electric furnace. A temperature change in the circumferential direction during the post weld heat treatment can be reduced by heating an entire rotor using the electric furnace. Furthermore, as the electric furnace, a vertical electric furnace is generally used to suppress creep deformation due to a weight of the rotor itself.

However, high costs are incurred in using an electric furnace capable of accommodating the rotor. Thus, a method of heating only the vicinity of a weld part may also be considered. However, in the method for heating only the vicinity of the weld part, there is a problem that it is difficult to reduce the temperature change during the post weld heat treatment compared to with an electric furnace configured to heat the surroundings around the rotor.

An object of the present invention is to provide a method for manufacturing a shaft body capable of minimizing strength unevenness in the vicinity of a weld part even if there is a large temperature change in a circumferential direction thereof in a post weld heat treatment.

Solution to Problem

According to a first aspect of the present invention, a method for manufacturing a shaft body is a method for manufacturing a shaft body by welding a plurality of shaft members together and forming the shaft body, the method for manufacturing the shaft body including: a primary tempering step of subjecting a range in at least one of the shaft members, which is in the vicinity of an end side of another shaft member side adjacent thereto, to tempering before the shaft members are welded together so that the strength of an end side of the range thereof is lower than the strength at a side which is opposite to the end of the range thereof; a welding step of welding the shaft members together after the primary tempering step; and a secondary tempering step of tempering the vicinity of a weld part between the shaft members after the welding step.

With such a constitution, the strength of a portion of the one shaft member, which is in the vicinity of the weld part, decreases so that a decrease in strength in the secondary tempering step is slight. Thus, even if change in temperature of a heating temperature in the circumferential direction in the secondary tempering step is large, strength unevenness in the vicinity of the weld part in the circumferential direction thereof can be reduced while strength at a site away from the weld part is secured.

Also, the vicinity of the weld part of the shaft member can be set to have a strength according to a necessary strength gradually changing in the axial direction thereof.

In the method for manufacturing the shaft body, the method for manufacturing the shaft body may include: a pre-weld material forming step of forming pre-weld materials of the shaft members; and a quenching step of subjecting the pre-weld materials of the shaft members to quenching after the pre-weld material forming step and before the primary tempering step.

In the method for manufacturing the shaft body, the primary tempering step may be performed by changing a tempering temperature in the range and a tempering temperature outside of the range.

With such a constitution, the tempering temperature is changed in the primary tempering step so that a temperature can be easily controlled.

In the method for manufacturing the shaft body, the secondary tempering step may include heating the vicinity of the weld part using a panel heater.

In the method for manufacturing the shaft body, the secondary tempering step may be performed in a state in which an axis of the shaft body is parallel to a horizontal direction.

In the method for manufacturing the shaft body, a rotor of a rotary machine may be manufactured as the shaft body.

In the method for manufacturing the shaft body, a turbine shaft may be formed as the rotor, the one shaft member may include a blade groove which is disposed at a position at which an ambient temperature in a turbine is in a medium and low temperature range, and at which a last-stage turbine blade may be installed, and a range at an upper stage side with respect to a last stage may be set as the range.

In the method for manufacturing the shaft body, the one shaft member may be formed of a low alloy steel, and the another shaft member may be formed of a high Cr steel.

With such a constitution, even if a high Cr steel with a high tempering temperature is welded to a low alloy steel, strength unevenness in the vicinity of the weld part in the circumferential direction thereof can be reduced.

Advantageous Effects of Invention

According to the present invention, a decrease in strength in a secondary tempering step is slight due to decreasing the strength of a portion, which is in the vicinity of a weld part, of the one shaft member. Thus, even if temperature displacement of a heating temperature in a circumferential direction in the secondary tempering step is large, strength unevenness in the vicinity of the weld part in the circumferential direction thereof can be reduced while strength at a site away from the weld part is secured.

DESCRIPTION OF EMBODIMENTS

First Embodiment

Hereinafter, a method for manufacturing a shaft body of a first embodiment of the present invention will be described in detail with reference to the drawings. In the following description, the method for manufacturing a shaft body of this embodiment will be described using a method for manufacturing a turbine rotor (a turbine shaft) of a steam turbine (a rotary machine).

Figure 1:
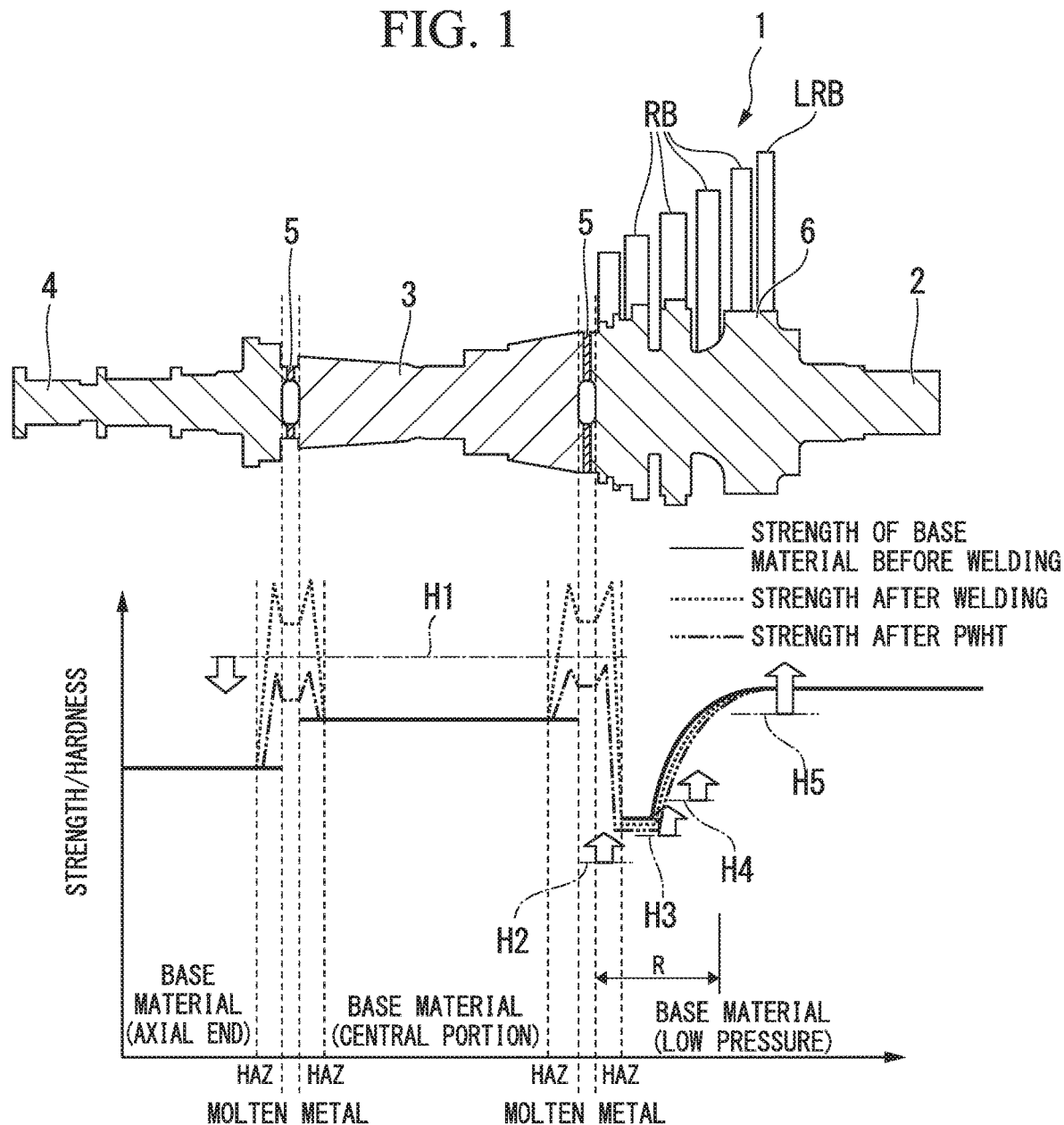
FIG. 1 is a view for describing a constitution and strength/hardness of a turbine rotor of a first embodiment of the present invention.

First, the turbine rotor manufactured using the method for manufacturing the shaft body of this embodiment will be described. As shown in FIG. 1, a turbine rotor 1 manufactured using the method for manufacturing the shaft body of this embodiment has a first shaft member 2 serving as a first end of the turbine rotor 1, a third shaft member 4 serving as a second end opposite to the first end of the turbine rotor 1, and a second shaft member 3 disposed between the first shaft member 2 and the third shaft member 4.

The first shaft member 2, the second shaft member 3, and the third shaft member 4 are welded together in an axial direction of the turbine rotor 1. The shaft bodies have shapes of which diameters change in a longitudinal direction thereof, and a cross-sectional shape of the turbine rotor 1 is a circular shape.

The turbine rotor 1 is a welded rotor of different steel types, the first shaft member 2 (a low-pressure turbine rotor) and the third shaft member 4 disposed at a position at which an ambient temperature in the steam turbine is in a medium and low temperature range are formed of low alloy steels, and the second shaft member 3 disposed at a position at which the ambient temperature in the steam turbine is in a high temperature region is formed of a high Cr steel with excellent high temperature strength.

To be specific, the first shaft member 2 is formed of a 3.5% NiCrMoV low alloy steel, the second shaft member 3 is formed of a 12% Cr steel, and the third shaft member 4 is formed of a 1 to 2.25% CrMoV low alloy steel.

The first shaft member 2 is a low-pressure turbine rotor, to which a plurality of turbine blades RB are attached. The attached turbine blades RB extend in a direction which is perpendicular to an axial direction of the first shaft member 2, and blade heights gradually become longer from an upstream side (the second shaft member 3 side) such that a last-stage turbine blade LRB is longest.

A blade groove 6 at which the last-stage turbine blade LRB is installed is formed in the first shaft member 2. The last-stage turbine blade LRB with a high blade height is attached to the blade groove 6 of the first shaft member 2, and a large centrifugal force (stress) is applied to the vicinity of the blade groove 6. Thus, high strength is needed for the blade groove 6 of the first shaft member 2.

A weld part 5 made of a welding metal is formed between the first shaft member 2 and the second shaft member 3 and between the second shaft member 3 and the third shaft member 4.

A relative strength of the turbine rotor 1 in the axial direction thereof is adjusted as indicated by a chain double dashed line of FIG. 1. In other words, a strength of the second shaft member 3 is higher than that of the third shaft member 4. A strength at a site on the blade groove 6 formed in the first shaft member 2 is higher than that of the second shaft member 3. To be specific, a strength at a site on the first shaft member 2 at which the blade groove 6 is formed is higher than a necessary strength H5 of the blade groove 6.

A strength of the first shaft member 2 in a range R, that is, a range at an upper stage side with respect to the blade groove 6, is lower than that at a site on the first shaft member 2 at which the blade groove 6 is formed. In other words, the strength of the same shaft member differs in accordance with positions in an axial direction thereon.

A necessary strength H2 of an end thereof in the range R, which is closest to the weld part 5 side, is significantly lower than the necessary strength H5 of the blade groove. The strength of the end thereof in the range R, which is closest to the weld part 5 side, is adjusted so that the strength thereof is higher than the necessary strength H2 of the corresponding site and is lower than a strength of the third shaft member 4.

In the range R of the first shaft member 2, adjustment is performed such that the strength of the first shaft member 2 gradually increases from the end thereof in the range R, which is closest to the weld part 5 side of the first shaft member 2, toward the blade groove 6.

Next, a method for manufacturing a shaft body by welding a plurality of shaft members 2, 3, and 4 together and forming the shaft body will be described.

Figure 2:
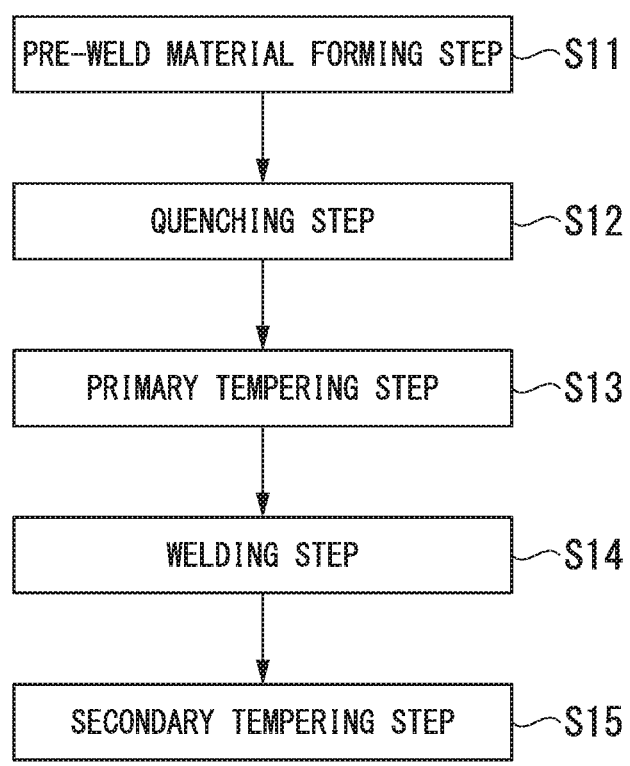
FIG. 2 is a flowchart for describing steps in a method for manufacturing the shaft body of the first embodiment of the present invention.

As shown in FIG. 2, a method M1 for manufacturing the shaft body of this embodiment includes a pre-weld material forming step S11 of forming pre-weld materials of the shaft members 2, 3, and 4, a quenching step S12 of subjecting the pre-weld materials of the shaft members 2, 3, and 4 to quenching, a primary tempering step S13 of subjecting the quenched pre-weld materials of the shaft members 2, 3, and 4 to tempering, a welding step S14 of welding the shaft members together, and a secondary tempering step S15 (post weld heat treatment) of subjecting welded heat affected zones to tempering after the welding step S14.

The pre-weld material forming step S11 is a step of casting a molten metal, which is molten, performing a forging/forming process, and forming the pre-weld materials of the shaft members 2, 3, and 4.

The quenching step S12 is a step of subjecting the pre-weld materials of the shaft members 2, 3, and 4 to quenching.

The pre-weld material of the first shaft member 2 formed of the 3.5% NiCrMoV low alloy steel is quenched to a temperature of 800 to 900° C.

The pre-weld material of the second shaft member 3 formed of the high Cr steel is quenched to a temperature of 1050 to 1150° C.

The pre-weld material of the third shaft member 4 formed of the 1 to 2.25% CrMoV low alloy steel is quenched to a temperature of 900 to 1000° C.

The primary tempering step S13 is a step of subjecting the quenched pre-weld materials of the shaft members 2, 3, and 4 to tempering.

Here, in the method M1 for manufacturing the shaft body of this embodiment, the second shaft member 3 and the third shaft member 4 are subjected to tempering so that the strength of the entire shaft members is uniform, but the first shaft member 2 is subjected to tempering to have strength differences in the axial direction thereof.

The second shaft member 3 is subjected to tempering by heating the quenched second shaft member 3 again at a temperature of 650 to 750° C.

The third shaft member 4 is subjected to tempering by heating the quenched third shaft member 4 again at a temperature of 600 to 700° C.

Next, tempering of the first shaft member 2 in the primary tempering step S13 will be described.

In the primary tempering step S13 of the first shaft member 2, only a material strength in the vicinity of the weld part 5 of the first shaft member 2 is adjusted to be lower. To be specific, tilting tempering, in which a strength difference between the vicinity (the range R shown in FIG. 1) of the weld part 5 and the blade groove 6 of the first shaft member 2 is provided, is performed. To be specific, tempering is performed so that a strength of the weld part 5 side in the range R is lower than a strength opposite to the weld part 5 in the range R. Welded heat affected zones (a heat-affected zone; HAZ) due to welding are in the vicinity of the weld part 5.

As shown in FIG. 1, in the case of a strength of the first shaft member 2 after the primary tempering step S13 is performed, a strength in the vicinity of an end thereof, which is welded to the second shaft member 3 is lower than that at a site away from the end thereof, which is welded to the second shaft member 3. The range at the upper stage side with respect to the blade groove 6 (a last stage) in the first shaft member 2 is set to the range R in which the material strength thereof is adjusted to be lower.

The strength in the range R gradually changes from a strength at the weld part 5 side of the first shaft member 2, to a strength at a side opposite to the weld part 5. The strength at the weld part 5 side (a joint part) is adjusted to be lower because the weld part 5 side does not need high strength. In other words, additional products such as turbine blades are not attached to a joint part of the first shaft member 2, and thus large stress is not applied. Thus, strength/hardness of the 3.5% NiCrMoV low alloy steel serving as the base material of the first shaft member 2 is not needed.

On the other hand, the strength at the side in the range R, which is opposite to the weld part 5, is adjusted to be higher because the blade groove 6 needs high strength.

To be specific, the necessary strength H2 at the end thereof, which is closest to the weld part 5 side, is significantly lower than the necessary strength H5 of the blade groove 6 (the last stage). A necessary strength H3 at a stage which is two stages before the last stage is slightly larger than the necessary strength H2 at the end thereof, which is closest to the weld part 5 side. A necessary strength H4 at a stage which is one stage before the last stage is slightly larger than the necessary strength H3 at a stage which is two stages before the last stage.

On the other hand, the necessary strength H4 at the stage which is one stage before the last stage is adjusted to be significantly smaller than the necessary strength H5 of the blade groove 6 (the last stage).

Figure 3:
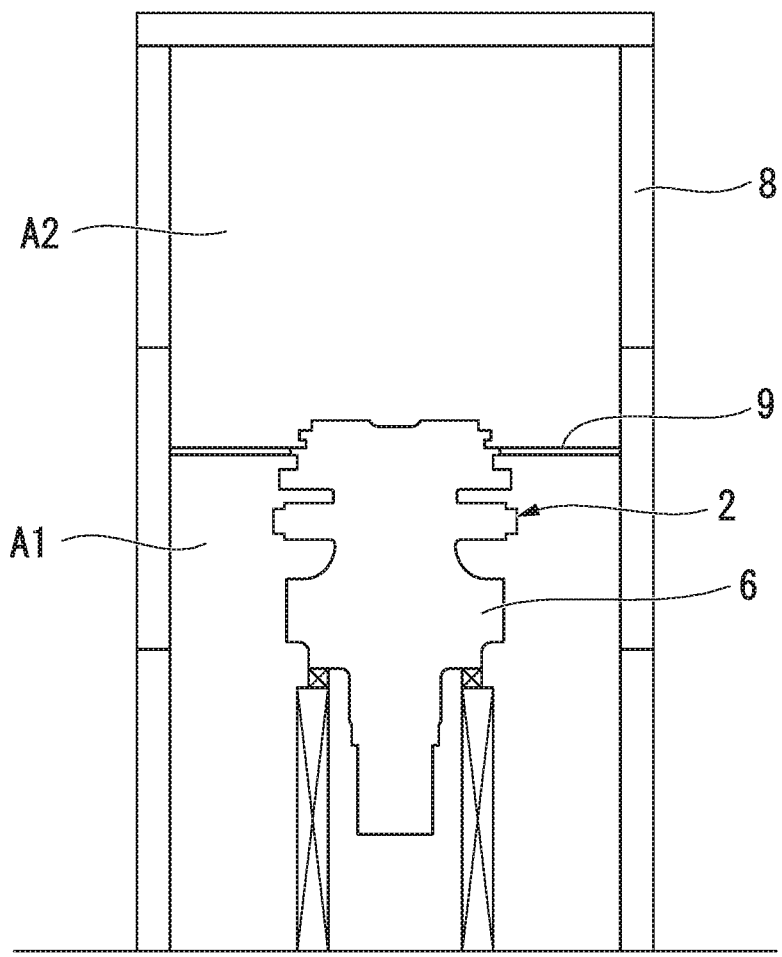
FIG. 3 is a schematic diagram for describing a method associated with a primary tempering step in the method for manufacturing the shaft body of the first embodiment of the present invention.

Next, a method for subjecting the first shaft member 2 to the tempering through which strength differences are imparted in the above-described range R will be described. As shown in FIG. 3, when the range R of the first shaft member 2 is subjected to the tempering, a partition plate 9 is introduced into a vertical-type cylindrical furnace 8 and a tempering temperature is changed so that strength differences are imparted. For example, a heating wire may be disposed at an inner surface of a circumferential wall of the vertical furnace 8 as a heating device.

To be specific, a region A1 below the partition plate 9 is subjected to the primary tempering for 40 to 60 hours in a temperature range of 550 to 600° C. A region A2 (the range R) above the partition plate 9 is subjected to the primary tempering for 40 to 60 hours in a temperature range of 600 to 650° C. A primary tempering temperature is controlled so that a temperature measured using a thermocouple attached to a shaft member surface falls in a range of ±5° C. with respect to a predetermined temperature. Furthermore, a transition temperature region in the vicinity of the partition plate 9 is preferably as narrow as possible.

The pre-weld material of the turbine rotor 1, of which sites have optimal strength characteristics and which has a uniform strength distribution in a circumferential direction, can be provided by performing the above-described heat treatment.

The welding step S14 is a step of butt-welding the shaft members, that is, the first shaft member 2, the second shaft member 3, and the third shaft member 4, together. In the welding step S14, the shaft members are aligned and are, for example, arc-welded using a 9% Cr-based filler material of which a nitrogen content is 0.025 mass % or less so that the weld part 5 (refer to FIG. 1) made of a welding metal is formed between the shaft members.

As indicated by a broken line in FIG. 1, in the welding step S14, the welded heat affected zones (HAZs) are formed. The welded heat affected zones are formed of the weld part 5 made of a welding metal and ends of the shaft members, which are in contact with the weld part 5.

As is clear from FIG. 1, strengths and hardnesses of the welded heat affected zone between the first shaft member 2 and the second shaft member 3 and the welded heat affected zone between the second shaft member 3 and the third shaft member 4 significantly increase. In other words, quenching hardenability of the welded heat affected zones is large, and the welded heat affected zones are significantly hard after welding. If a hardness of the weld part 5 is, for example, HV 350 or more, delayed cracks are likely to be generated when the turbine is used. Thus, the hardness thereof needs to be decreased to a hardness of a standard value or less in the secondary tempering step S15.

The secondary tempering step S15 is a step called a post weld heat treatment (PWHT) in which the welded heat affected zones are subjected to tempering after the welding step S14. The secondary tempering step S15 includes local tempering in which only the welded heat affected zones are heated and heating the welded heat affected zones using a panel heater in a state in which an axis of the turbine rotor 1 is parallel to a horizontal direction. In addition to the panel heater, the welded heat affected zones are preferably heated using a high frequency heating device or the like as an aid.

To be specific, a joining portion between the first shaft member 2 and the second shaft member 3 is subjected to the post weld heat treatment in a temperature range of 595 to 620° C. for 40 to 60 hours. Furthermore, a joining portion between the second shaft member 3 and the third shaft member 4 is subjected to the post weld heat treatment in a temperature range of 625 to 650° C. for 40 to 60 hours.

As described above, the secondary tempering step S15 is performed in a state in which the turbine rotor 1 is directed sideward. This is because the local tempering is performed using the panel heater in the secondary tempering step S15. In other words, only the vicinity of the weld part 5 is heated using the panel heater so that creep deformation during heat treatment need not be considered.

As indicated by a dashed-dotted line in FIG. 1, after the secondary tempering step S15, the strength and hardness of the welded heat affected zones are lower than a reference value H1 (upper limit of an HAZ hardness). On the other hand, the strength of the portion of the first shaft member 2, which is closest to the weld part 5 side, is higher than the necessary strength H2 of the corresponding site. In other words, the strength of the first shaft member 2 determined in the primary tempering step S13 is set in consideration of the strength thereof decreasing via the secondary tempering step S15. Similarly, the strength of the blade groove 6 in the first shaft member 2 is higher than the necessary strength H5 of the corresponding site.

In other words, the strength of the first shaft member 2 in the primary tempering range R has a gradient such that the strength at the end thereof or at the blade groove 6 is maintained at a necessary strength or higher.

According to the above-described embodiment, the strength of a portion of the first shaft member 2, which is in the vicinity of the weld part 5, decreases so that a decrease in strength in the secondary tempering step S15 (the post weld heat treatment) is slight. Thus, even if a temperature change in a heating temperature in a circumferential direction in the secondary tempering step S15 is large, strength unevenness in the vicinity of the weld part 5 in the circumferential direction thereof can be reduced.

In other words, even if a panel heater in which temperature unevenness in the circumferential direction is large is used, strength unevenness in the vicinity of the weld part 5 in the circumferential direction thereof can be reduced.

In other words, strength change due to an influence of temperature change in the circumferential direction during the secondary tempering step S15, that is, the post weld heat treatment, can be reduced. Thus, an allowable width of a temperature change in the circumferential direction in the secondary tempering step S15 becomes larger, and thus uniformity of the strength in the circumferential direction after the secondary tempering step S15 can be secured.

Thus, when the welded rotor of different steel types is manufactured, if the low-pressure turbine rotor, which has the blade groove 6 with high required strength, and in which the ambient temperature in the steam turbine is in the medium and low temperature range, is welded to another rotor, strength unevenness in the vicinity of the weld part 5 in the circumferential direction thereof can be reduced while the strength of the blade groove 6 is secured.

Also, even if the second shaft member 3 formed of the high Cr steel with the high tempering temperature is welded to the first shaft member 2 formed of the low alloy steel, strength unevenness in the vicinity of the weld part 5 in the circumferential direction thereof can be reduced.

The strength in the range R gradually changes so that the vicinity of the weld part 5 of the first shaft member 2 can be set to have a strength according to a necessary strength gradually changing in the axial direction thereof.

The method for heating only the vicinity of the weld part 5 using the panel heater is used in the secondary tempering step S15 so that the post weld heat treatment can be performed at a low cost compared to a method of using an electric furnace.

The heating of the post weld heat treatment in the secondary tempering step S15 is performed in the state in which the axis of the turbine rotor 1 is parallel to the horizontal direction so that the post weld heat treatment can be performed without using a vertical facility such as a vertical electric furnace.

Second Embodiment

Hereinafter, a method for manufacturing a shaft body of a second embodiment of the present invention will be described on the basis of the drawings. Note that this embodiment will be described focusing on differences from the first embodiment described above and descriptions of the same portions will be omitted.

In the method for manufacturing the shaft body of this embodiment, feedback is given to heat treatment conditions on the basis of actual strength (hardness) measurement data after the welding and actual temperature measurement data during the heat treatment, and thus a target strength accuracy after the heat treatment is further improved.

Figure 4:
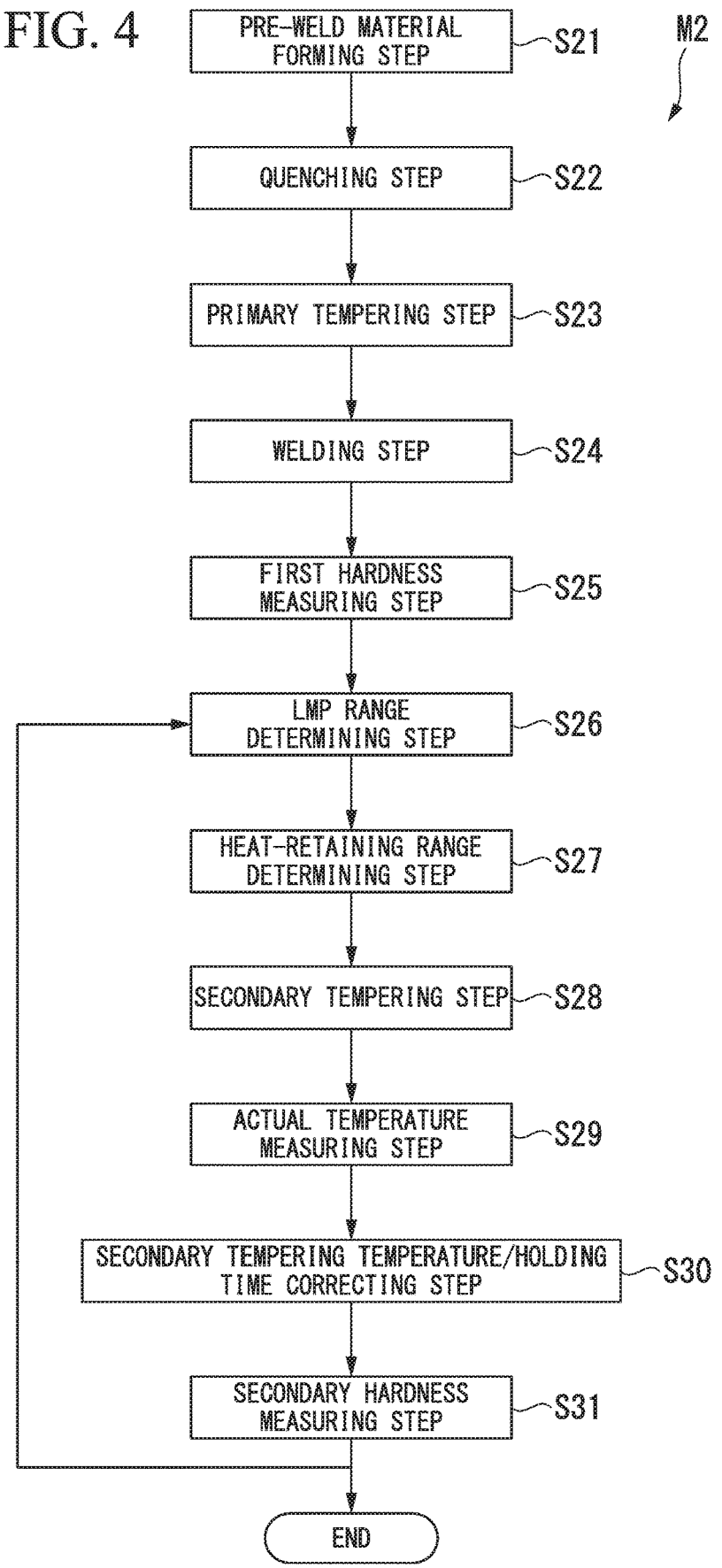
FIG. 4 is a flowchart for describing steps in a method for manufacturing a shaft body of a second embodiment of the present invention.

As shown in FIG. 4, a method M2 for manufacturing the shaft body of this embodiment includes a pre-weld material forming step S21 similar to that of the first embodiment, a quenching step S22, a primary tempering step S23, a welding step S24 of welding shaft members together, a first hardness measuring step S25 of measuring hardnesses of welded heat affected zones and a base material, a Larson-Miller parameter (LMP) range determining step S26 of determining an LMP range in a post weld heat treatment, a heat-retaining range determining step S27 of analyzing temperatures and determining a heating/heat-retaining range of the post weld heat treatment, a secondary tempering step S28 similar to that of the first embodiment, an actual temperature measuring step S29 of measuring an actual temperature of a turbine rotor 1, a secondary tempering temperature/holding time correcting step S30 of correcting a temperature/holding time of the post weld heat treatment, and a secondary hardness measuring step S31 of measuring hardness after the post weld heat treatment.

The first hardness measuring step S25 is a step of measuring a hardness (Vickers hardness Hv) of welded heat affected zones (HAZs) of the turbine rotor 1 after the welding and a hardness of a base material of the turbine rotor 1.

Figure 5:
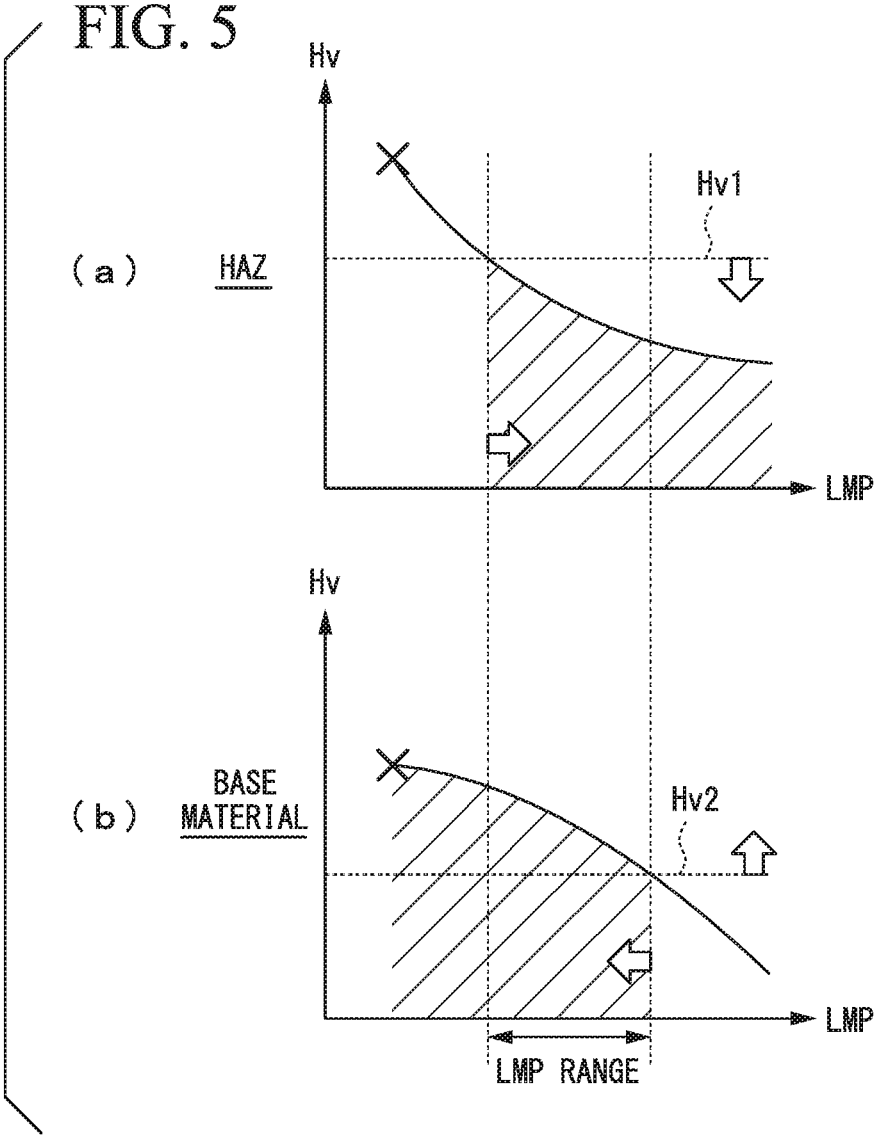
FIG. 5($a$) is a Larson-Miller parameter (LMP) plot of a welded heat affected zone, and FIG. 5($b$) is an LMP plot of a base material used for the method for manufacturing the shaft body of the second embodiment of the present invention.

The LMP range determining step S26 is a step of determining an LMP range of the secondary tempering step S28 (the post weld heat treatment) using an LMP plot of the welded heat affected zones and an LMP plot of a base material as shown in FIG. 5.

Here, an LMP is a function of time and temperature which is also referred to as a tempering parameter and is represented as the following expression.

$$LMP = (T+273) \times (\log \cdot t + 20); \text{ T: temperature (° C.) and t: holding time (hours)}$$

FIG. 5(a) is a graph illustrating a relationship between hardness of a welded heat affected zone and a Larson-Miller parameter (LMP). FIG. 5(b) is a graph illustrating a relationship between hardness of a base material and a Larson-Miller parameter (LMP).

In the LMP range determining step S26, an LMP range in which the hardness of the welded heat affected zone is hardness Hv 1 or less shown in FIG. 5(a) and the hardness of the base material is hardness Hv 2 or more shown in FIG. 5(b) is determined.

Figure 6:
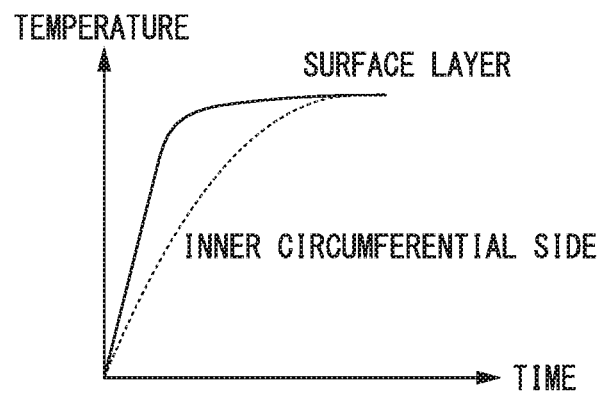
FIG. 6 is a graph illustrating results of actual temperature measurement used for the method for manufacturing the shaft body of the second embodiment of the present invention.

The heat-retaining range determining step S27 is a step of measuring an actual temperature in the vicinity of a weld part 5 in a circumferential direction thereof, controlling a temperature distribution so that a heat treatment conditions range falls in an LMP range determined in the LMP range determining step S26, and adjusting a holding time. For example, as shown in FIG. 6, change in the actual temperature in the circumferential direction according to time differs between a surface layer and an inner circumferential side. Thus, the heating/heat-retaining range is determined in consideration of this as well.

In the secondary tempering step S28 (the post weld heat treatment) of this embodiment, the actual temperature measuring step S29 of measuring the actual temperature (an axial direction and a circumferential direction) of the turbine rotor 1 is performed. An amount of hardness change (the welded heat affected zones and the base material) is predicted by performing the actual temperature measuring step S29.

Figure 7A:
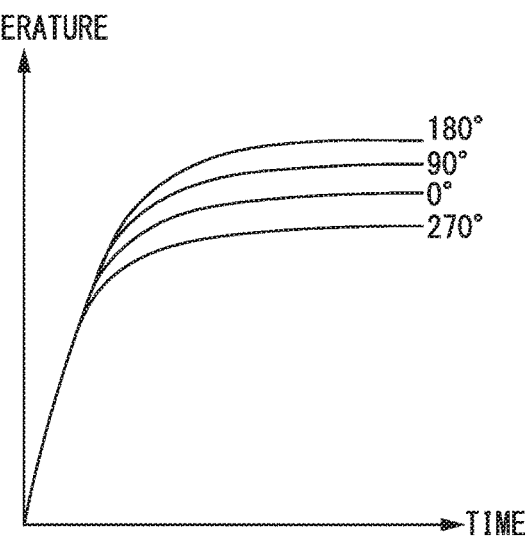
FIG. 7A is a graph illustrating a temperature change in a secondary tempering step used for the method for manufacturing the shaft body of the second embodiment of the present invention.

The secondary tempering temperature/holding time correcting step S30 is a step of correcting a temperature/holding time in the secondary tempering step S28, for example, when a temperature change in the secondary tempering step S28 differs in accordance with a position in the circumferential direction as shown in FIG. 7A.

Figure 7B:
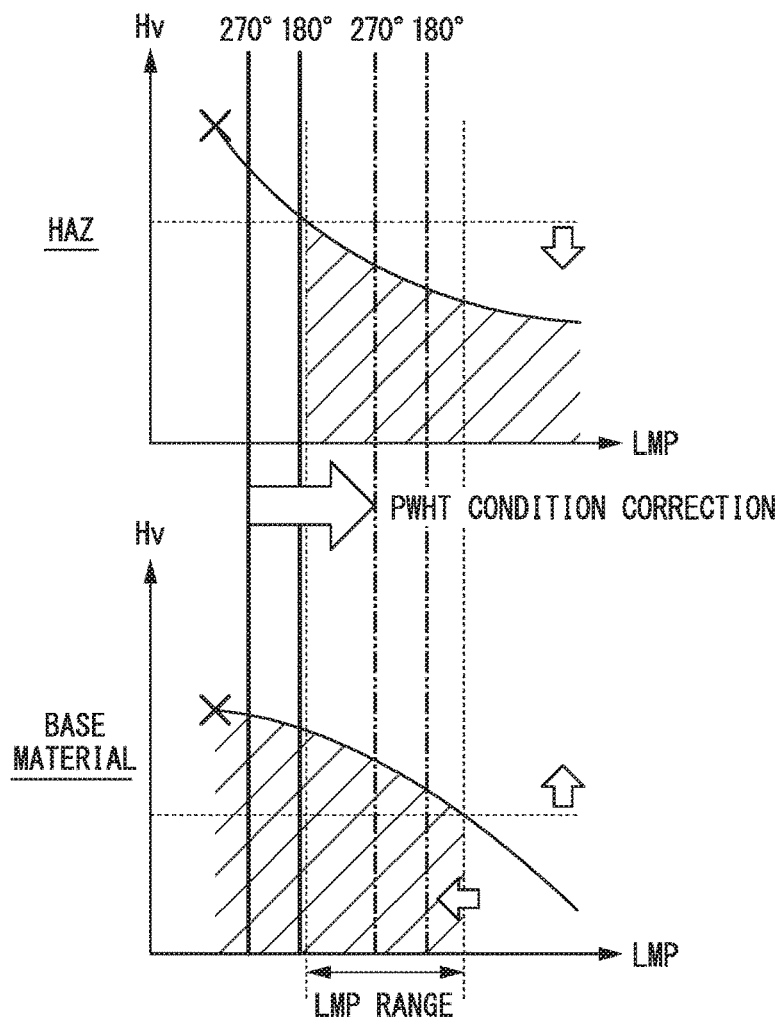
FIG. 7B is a graph for describing a method for correcting conditions of post weld heat treatment used for the method for manufacturing the shaft body of the second embodiment of the present invention.

As described above, when the temperature change in the secondary tempering step differs in accordance with the position in the circumferential direction, and for example, as shown in FIG. 7B, LMPs at 180 to 270° C. are outside of an LMP range determined in the LMP range determining step S26, the conditions of the post weld heat treatment are corrected so that the LMPs at 180 to 270° C. fall in the LMP range.

The secondary hardness measuring step S31 is a step of measuring a hardness of the welded heat affected zones of the turbine rotor 1 after the secondary tempering step S28 and a hardness of the base material of the turbine rotor 1. The method M2 for manufacturing the shaft body of this embodiment ends when the hardness of the base material and the welded heat affected zones measured in the secondary hardness measuring step S31 are in a required hardness range, and the process returns to the LMP range determining step when any of the hardnesses are outside of this range.

According to the above-described embodiment, the conditions are selected and corrected on the basis of the actual strength/actual temperature so that accuracy of a target strength value after the heat treatment can be improved.

The embodiments of the present invention have been described above in detail with reference to the drawings, but constitutions in the embodiments, combinations thereof, and the like are merely an example. In addition, additions, omissions, substitutions, and other modifications can be made without departing from the gist of the present invention. The present invention is not limited by the embodiments and is only limited by the scope of the claims.

For example, a case in which the turbine rotor 1 is used as the shaft body has been described in the above-described embodiments, but the shaft body is not limited to a columnar member like the turbine rotor 1 and a shaft body or the like in which prismatic columnar members are welded together can also be applied.

REFERENCE SIGNS LIST

1 Turbine rotor (shaft body)
2 First shaft member
3 Second shaft member
4 Third shaft member
5 Weld part
6 Blade groove
8 Vertical furnace
9 Partition plate
M1, M2 Method for manufacturing shaft body
S11 Pre-weld material forming step
S12 Quenching step
S13 Primary tempering step
S14 Welding step
S15 Secondary tempering step
R Range

The invention claimed is:

1. A method for manufacturing a shaft body by welding a plurality of shaft members together and forming the shaft body, the method comprising:
   a primary tempering step of tempering the plurality of shaft members before welding the plurality of shaft members together;
   a welding step of welding the shaft members together after the primary tempering step to form a weld part;
   a secondary tempering step of tempering the vicinity of the weld part between the shaft members after the welding step;
   a pre-weld material forming step of forming pre-weld materials of the shaft members; and
   a quenching step of subjecting the pre-weld materials of the shaft members to quenching after the pre-weld material forming step and before the primary tempering step, wherein
   after the welding step, in a range continuing to a first end of one of the plurality of shaft members forming the weld part, a strength of the first end closer to the weld part is lower than the strength of a second end farther from the weld part with respect to the first end, and
   the primary tempering step is performed by changing a tempering temperature in the range and a tempering temperature outside of the range.

2. The method for manufacturing the shaft body according to claim 1, wherein the secondary tempering step includes heating the vicinity of the weld part using a panel heater.

3. The method for manufacturing the shaft body according to claim 1, wherein the secondary tempering step is performed in a state in which an axis of the shaft body is parallel to a horizontal direction.

4. The method for manufacturing the shaft body according to claim 1, wherein a rotor of a rotary machine is manufactured as the shaft body.

5. The method for manufacturing the shaft body according to claim 4, wherein a turbine shaft is formed as the rotor,
   the one shaft member includes a blade groove at which a last-stage turbine blade is installed, the last-stage turbine blade having the highest blade height than other turbine blades included in the one shaft member, and
   the range is determined to include an upstream side of the blade groove at which the last-stage turbine blade is installed.

6. The method for manufacturing the shaft body according to claim 1, wherein the one shaft member is formed of a low alloy steel, and another one of the plurality of shaft members is formed of a high Cr steel.

7. The method for manufacturing the shaft body according to claim 1, wherein in the primary tempering step, the tempering temperature in the range is set to be 600 to 650° C.

8. The method for manufacturing the shaft body according to claim 7, wherein in the primary tempering step, the tempering temperature outside of the range is set to be 550 to 600° C.

9. The method for manufacturing the shaft body according to claim 8, wherein the primary tempering step is performed for 40 to 60 hours.

* * * * *